United States Patent [19]

Marlowe et al.

[11] Patent Number: 4,942,016

[45] Date of Patent: Jul. 17, 1990

[54] NUCLEAR FUEL ELEMENT

[75] Inventors: Mickey O. Marlowe; Herman S. Rosenbaum, both of Fremont; Trevor C. Rowland, San Jose; Charles B. Patterson, Jr., San Jose; John H. Davies, San Jose, all of Calif.

[73] Assignee: General Electric Company, San Jose, Calif.

[21] Appl. No.: 245,482

[22] Filed: Sep. 19, 1988

[51] Int. Cl.$^5$ .............................................. G21C 3/00
[52] U.S. Cl. .................................... 376/418; 376/412; 376/421
[58] Field of Search ................... 376/418, 412 X, 414, 376/416, 421 X

[56] References Cited

U.S. PATENT DOCUMENTS

| 3,969,186 | 7/1976 | Thompson | 376/418 |
| 4,406,012 | 9/1983 | Gordon | 376/414 |
| 4,659,540 | 4/1987 | Cheng | 376/417 |
| 4,869,867 | 9/1989 | Lay | 376/421 |

Primary Examiner—Donald P. Walsh
Attorney, Agent, or Firm—Robert R. Schroeder

[57] ABSTRACT

An improved nuclear fuel element for service in power generating, water cooled nuclear reactors, comprising a fuel cladding container of an alloy of zirconium provided with a barrier lining of unalloyed zirconium metal metallurgically bonded to the container's inner surface, and enclosed therein fissionable nuclear fuel including an additive of aluminum silicate.

10 Claims, 2 Drawing Sheets

A — UNMODIFIED FUEL / ZIRCALOY-2 CONTAINER
B — UNMODIFIED FUEL / ZIRCONIUM LINER — ZIRCALOY-2 CONTAINER
C — FUEL WITH ALUMINUM SILICATE ADDITIVE / ZIRCALOY-2 CONTAINER
D — FUEL WITH ALUMINUM SILICATE ADDITIVE / ZIRCONIUM LINER — ZIRCALOY-2 CONTAINER

A — UNMODIFIED FUEL / ZIRCALOY-2 CONTAINER

B — UNMODIFIED FUEL / ZIRCONIUM LINER — ZIRCALOY-2 CONTAINER

C — FUEL WITH ALUMINUM SILICATE ADDITIVE / ZIRCALOY-2 CONTAINER

D — FUEL WITH ALUMINUM SILICATE ADDITIVE / ZIRCONIUM LINER — ZIRCALOY-2 CONTAINER

NUCLEAR FUEL ELEMENT

FIELD OF THE INVENTION

This invention relates to an improved nuclear fuel element comprising an elongated container, such as a tube-like unit, with a body of fissionable nuclear fuel confined therein for service in power generating, water cooled nuclear reactors. The fissionable fuel material used in such service is sealed within the cladding container housing to isolate it from contact with the coolant and thereby preclude any reaction therebetween and also contamination of the coolant with radioactive matter from the fuel or resulting fission products.

Conventional fissionable fuel elements for power generating, water cooled nuclear reactors comprise oxides of enriched uranium in the form of pellets, enclosed within a container of an alloy of zirconium metal such as zircaloy-2 (U.S. Pat. No. 2,772,964). In some instances, the uranium oxide is replaced by urania-gadolinia mixtures or solid solutions, and in other instances the uranium may be partially replaced b plutonium and/or thorium.

Experience has shown that after extensive exposure to the radiation in the core of a nuclear reactor, typical fuel elements are susceptible to failures due to breaching of their containers during rapid power increases. A breach of the container has been determined to be a result of the stress imposed by heat expanded fuel contents upon the inner surface of the metal container which has been embrittled by prolonged radiation exposure and corroded by the presence of accumulated fission products from the fuel retained therein.

Studies of the deleterious phenomenon have established that three conditions contribute to produce such a failure of the fuel container, which is commonly referred to as "stress corrosion cracking". First, the metal must be susceptible to stress corrosion cracking in the irradiation environment; second, a level of physical stress must be present; and, third, there must be exposure to aggressive corrosive agents. Metal failure due to stress corrosion cracking can be mitigated or even eliminated by alleviating any one or more of these three conditions.

One effective means for deterring such failures in conventional fuel elements comprising zirconium alloy containers, such a zircaloy-2, housing uranium oxide fuel, has been to include a metallurgically bonded barrier liner of unalloyed zirconium metal over the inner surface of the alloy container substrate. The unalloyed zirconium metal of the barrier liner is more resistant to irradiation-embrittlement than the alloy substrate whereby it retains its relatively soft and plastic characteristics throughout its service life notwithstanding its prolonged exposure to irradiation. Localized physical stresses imposed on such a barrier lined container by the heat expanding fuel during rapid power increases are moderated by the plastic flow of the relatively soft unalloyed zirconium metal of the liner. Moreover, the unalloyed zirconium metal has been found to be less susceptible than alloys to the corrosive effects of fission products. That is, the unalloyed zirconium has resistance to the formation of cracks in the presence of corrosion fission products.

The effectiveness of the unalloyed zirconium barrier liner in resisting the deleterious stress corrosion cracking phenomenon due to the interaction between the fuel pellets and cladding container in the presence of a corrosive environment of irradiation products, is achieved by mitigating the physical stress and susceptibility to corrosion of the overall container.

Effective unalloyed zirconium barrier linings for nuclear fuel elements are disclosed in U.S. Pat. No 4,200,492 and U.S. Pat. No. 4,372,817.

Another approach to this problem of stress corrosion cracking as a cause of failure of fuel elements when subjected to frequent and drastic power increases, has been to modify the physical properties of the uranium oxide fuel with additives. For example, aluminum silicates, and clays comprising aluminum silicates, when dispersed through oxides of uranium in amounts as low as a few tenths of one percent, have been demonstrated to be effective in increasing the plasticity of fuel pellets composed thereof, whereby the heat expansion induced physical stress attributable to the fuel pellets is reduced.

Aluminum silicate additives blended with uranium oxide fuel have been found to be effective in eliminating or mitigating two of the three conditions which must be simultaneously present to produce stress corrosion failures in the metal of a fuel container. An aluminum silicate additive substantially increases the creep rate of fuel pellets comprising oxides of uranium and thereby reduces the stress imposed o the cladding tube due to thermal expansion of the fuel material. The enhanced plastic deformation and deformation rates attributable to this additive enables the modified fuel to flow into its own void volume and/or into any available open crack volume within the interior of the fuel cladding container, and thereby distribute the physical interaction force due to thermal expansion over a greater area. Thus high localized stresses are mitigated by increased distribution of their forces.

Moreover, the aluminum silicate introduced into the fuel reacts with fission products produced during irradiation and accordingly reduces the concentration of aggressive fission products which, in the presence of physical stresses, are a cause of cracking in the metal of the fuel cladding containers.

The effects of additives comprising aluminum silicates upon fissionable nuclear fuels, including their relative quantities, are disclosed in U.S. Pat. No. 3,679,596; U.S. Pat. No. 3,715,273; U.S. Pat. No. 3,826,754; U.S. Pat. No. 3,872,022; and U.S. Pat. No. 4,052,330.

The disclosed contents of the foregoing United States Letters Patent, namely U.S. Pat. No. 4,200,492; U.S. Pat. No. 4,372,817; U.S. Pat. No. 3,679,596; U.S. Pat. No. 3,715,273; U.S. Pat. No. 3,826,754; U.S. Pat. No. 3,872,022; and U.S. Pat. No. 4,052,330, which illustrate the state of the art relevant to the invention disclosed and claimed herein, are each incorporated herein by reference.

BACKGROUND OF THE INVENTION

This invention is concerned with the problem of nuclear fuel element failure resulting from a breach of the cladding container housing the fissionable fuel material. The container is employed to physically isolate and seal therein the fissionable fuel and fission products generated from any exposure to and/or contamination of the surrounding coolant such as water.

Entry of coolant water or vapor through a fracture in the container housing whereby it comes into contact with the enclosed fuel subjects the fuel to destructive reactions as well as leaking contaminating fission products out into the cooling medium of the overall system.

SUMMARY OF THE INVENTION

The invention described hereinafter is concerned with an improved nuclear fuel element having a specific construction and composition which in concert acts effectively in overcoming all factors which contribute to the failure of fuel cladding containers due to stress corrosion cracking. Specifically the combination of construction and composition of the improved fuel element coact to effectively minimize or eliminate all causitive conditions which support stress corrosion, namely, physical stress, corrosive environment and susceptible material.

OBJECT OF THE INVENTION

It is a primary object of this invention to provide an improved nuclear fuel element which will endure aggressive service.

It is also an object of this invention to provide a nuclear fuel element which is more resistant to failure due to cracking of its container wall.

It is a further object of this invention to provide an improved fuel element which can endure frequent and rapid power increases in service over extended periods of exposure to high fission "burn up" while resisting cracking or other failing breaches.

It is an additional object of this invention to provide an improved nuclear fuel element which is highly resistant to stress corrosion, and cracking caused thereby.

It is still another object of this invention to provide a nuclear fuel element of a unique combination of construction and composition that mitigates and/or eliminates the causitive factors of stress corrosion cracking including physical stress, corrosive components and susceptible material.

DETAILED DESCRIPTION OF THE INVENTION

This invention comprises a nuclear fuel element having a composite cladding container provided with an internal barrier of a soft metallic lining such as unalloyed zirconium metal, metallurgically bonded thereto, and containing therein fissionable fuel comprising an oxide of uranium modified with an additive of an aluminum silicate. The attributes and effects of this combination of structure and composition are not only complimentary, but are synergistic in providing superior performance, especially at high burnup such as beyond about 35 MWd/kg. This synergistic superior performance is manifested in the endurance of the fuel elements to withstand sudden power ramps (increases) to high power levels and to sustain severe power cycling while preserving their integrity.

Figure 1:
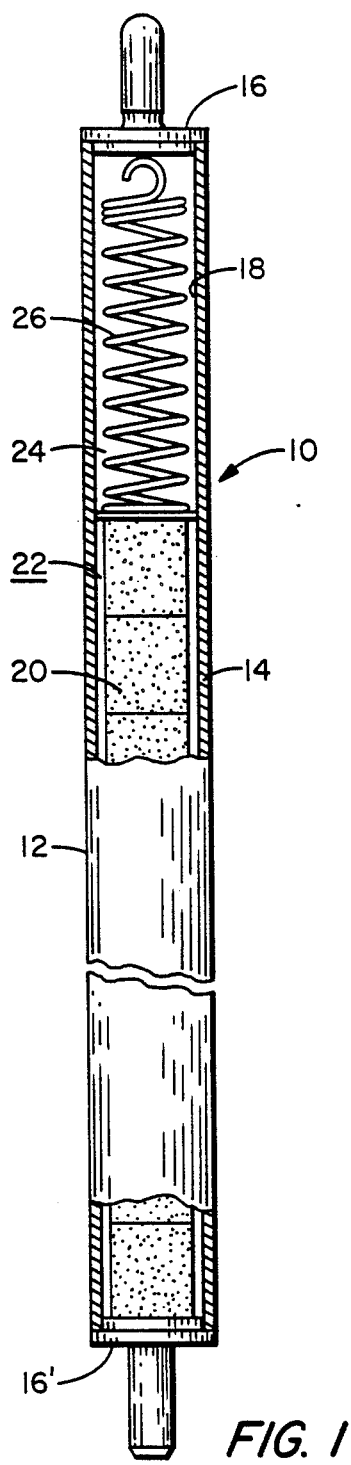
FIG. 1 is an elevation or longitudinal view, partly in cross-section, of a nuclear fuel element comprising the composite cladding container or tube housing a column of pellets of the nuclear fuel material.

Referring to the drawings, in particular to FIG. 1, there is shown a partially cutaway sectional view of nuclear fuel element 10. The fuel element 10 comprises an elongated composite cladding container 12 which typically consists of a tube-like body 14 closed at both ends with welded in place upper and lower end plugs 16 and 16' to provide a sealed enclosure. In accordance with on principal aspect of this invention, the fuel cladding container 12 consists of a tube 14 of an alloy of zirconium which has been provided with a lining 18 of unalloyed zirconium metal metallurgically bonded over the inner surface of the alloy tube 14 substrate. The lining 18 of unalloyed zirconium, which is metallurgically bonded over the inner surface of the substrate tube 14, is provided in a thickness of from about 5 percent to about 30 percent of the thickness of the composit cladding tube 12, and preferably greater than 40 micro meters thick.

Housed within the sealed composite cladding container 12, is a core or centrical cylindrical portion of nuclear fuel material 20, here shown as a plurality of fuel pellets of fissionable and/or fertile material stacked in a column. Fuel pellets may be of various shapes such as cylindrical pellets or spheres, and in some cases, different fuel forms such a particulate fuel may be used.

Figure 2:
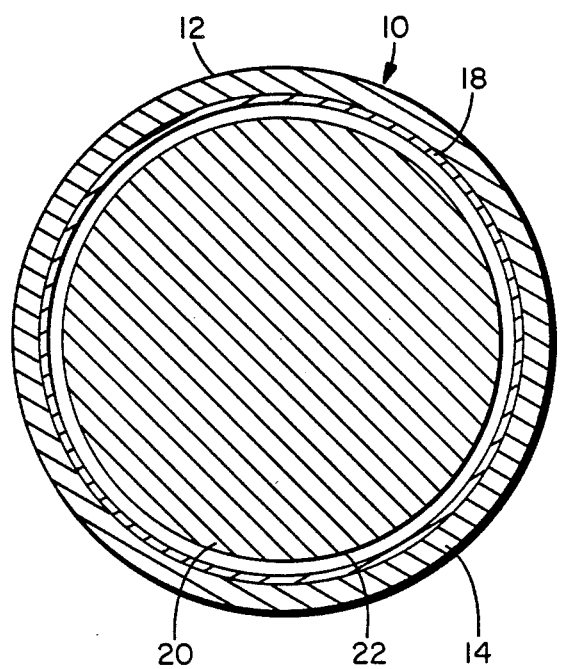
FIG. 2 is an enlarged cross-sectional view of the nuclear fuel element of FIG. 1.

Referring to FIG. 2, the core of fuel material 20 and cladding container 12 are typically designed so as to provide a gap illustrated as 22 or void between the inner surface of the cladding and the outer diameter of the fuel core.

Conventionally the core of fuel material 20 does not occupy the full length of the cladding container 12 as shown. The column of pellets forming the fuel core 20 is provided in a length shorter than the cladding container 12 whereby there is an end void space or plenum 24 provided. The plenum 24 enables longitudinal expansion of the column of fuel material and serves as an area for the accumulation of gaseous products released from the fuel undergoing fission and irradiation. Preferably retainer means such as a spring 26 is employed positioned within plenum 24 to provide restraint against the axial movement of the column of fuel, especially during handling and transportation of the fuel element.

Zirconium alloys suitable for the tube-like body 14, or substrate, providing the cladding container 12 include those known in the trade as zircaloy-2 and zircaloy-4. Zircaloy-2 has on a weight basis about 1.5 percent tin; about 0.14 percent iron; about 0.1 percent chromium; and about 0.05 percent nickel, and the balance zirconium. Zircaloy-4 has less nickel but contains slightly more iron than zircaloy-2. Further details regarding these alloys are given in U.S. Pat. No. 2,772,969 and U.S. Pat. No. 3,148,055.

The barrier lining 18 which is metallurgically bonded over the inner surface of the alloy tube 14 substrate, comprises unalloyed zirconium metal grades known in the trade as crystal bar zirconium and sponge zirconium. Specifically the zirconium metal should contain less than about 5000 parts per million of impurities or non-zirconium ingredients, and preferably less than about 4200 parts per million. Of these oxygen should be within a range of about 200 to about 1200 parts per million. All other impurities should be within the normal commercial range for crystal bar and sponge grade zirconium, namely: aluminum—up to about 75 ppm; boron—up to about 0.4 ppm; cadmium—up to about 0.4 ppm; carbon—up to about 270 ppm; chromium—up to about 200 ppm; cobalt—up to about 20 ppm; copper—up to about 50 ppm; hafnium—up to about 100 ppm; hydrogen—up to about 25 ppm; iron—up to about 1500 ppm; magnesium —up to about 20 ppm; manganese—up to about 50 ppm; molybdenum—up to about 50 ppm; nickel—up to about 70 ppm; niobium—up to about 100 ppm; nitrogen—up to about 80 ppm; silicon—up to about 120 ppm; tin—up to about 50 ppm; tungsten—up to about 100 ppm; titanium—up to about 50 ppm; and uranium—up to about 3.5 ppm.

Another principal aspect of this invention comprises the composition of the fuel material utilized within the specified cladding container. Fissionable nuclear fuels for use in this invention comprise conventional oxides of enriched uranium, plutonium and thorium, and mixtures thereof, and may include gadolinium or other common neutron absorbers or so-called "poisons". Uranium dioxide is the preferred fissionable fuel for the practice of this invention.

Additives for use in this invention to modify conventional nuclear fuels include aluminum silicate and materials containing aluminum silicates such as clays, or which form aluminum silicates such as combinations comprising alumina and silica. Kaolin and bentonite clays are examples. Appropriate additive sources are disclosed in U.S. Pat. No. 3,826,754.

Additives of aluminum silicate can be combined with conventional fuel materials in any effective ratios or amounts, typically about 0.05 up to about 5.0 percent by weight of the overall modified fuel, and preferably from about 0.1 percent up to about 1.0 percent. However, it is generally desirable to minimize the proportion of such additives introduced into the fuel because they displace fissionable or fertile material and thereby detract from the efficiency of the fuel material.

The synergistic effects attributable to the novel fuel element of this invention are based upon several mechanistic phenomena, which can be classified as: (a) mechanical, or the reduction of tensile stress in the cladding container, (b) chemical, or amelioration of certain known corrosive fission product species, and (c) mechanical/chemical, wherein the chemical effect in (b) acts as synergistically to offset the strain rate sensitivity of the fuel cladding container structure to the harmful effects of "pellet-cladding interaction".

The mechanical synergism of this invention is demonstrated as follows. On each power increase of the nuclear reactor, the resulting thermal expansion of the body of fuel imposes a stress upon its enclosing cladding container. The relatively soft unalloyed zirconium lining of the cladding container ameliorates the localized stress of the cladding container inner surface, which is where cracks are known to be initiated. The immediate stress relaxation of the cladding container inner surface occurs by rapid primary creep of the cladding container. The modified fuel also acts to accommodate the stress in the system of this invention by a rapid hot-pressing wherein the available volume therein is filled. Thereafter, the system stresses are relaxed by a slower mechanism, that of secondary creep. The cladding container outward deformation due to the stress is limited by the secondary creep rate of the zirconium alloy substrate portion of cladding container wall which is slow compared with the deformation processes in the additive modified fuel body. Thus, the high secondary creep rate of the modified fuel in conjunction with the rapid relaxation mechanism (primary creep of the unalloyed zirconium lining and primary creep/hot-pressing of the fuel) provide a structure in which internal stresses are reduced to accommodate both the initial rapid fuel expansion and also the slower expansion occurring only in high burnup fuel due in part to fission gas bubble precipitation within the fuel.

Although the Zr-barrier fuel cladding has resistance to failure by pellet-cladding interaction, large power increases are known to produce microcracks at the inner surface of the cladding (at the pellet-cladding interface). Because of the softness of the zirconium liner, these do not grow rapidly as they would in the harder zirconium alloy materials. However, such microcracks are susceptible to growth under cyclic loading situations. When used in conjunction with modified fuel pellets, the compliance of the modified pellets prevents the stress accumulation (ratcheting) on power cycle that otherwise might cause the microcracks in the zirconium liner to grow. Resistance to power cycling is another aspect of mechanical synergism.

The chemical synergism of this invention is demonstrated as follows. Studies have shown that certain fission products comprising iodine and cadmium tend to produce cracking in the wall of fuel cladding containers. The unalloyed zirconium liner of cladding containers has been determined to provide a high degree of resistance to stress corrosion cracking due to iodine compounds. However, it has been found that cadmium is the most aggressive environment known, and that the adverse effect of cadmium is exacerbated by the presence of cesium. Aluminosilicate additives act to arrest the cesium within the fuel body and thereby prevents it from reaching the cladding container.

As the nuclear fuel is expended and more fissions occur in the irradiation-induced heavy transuranic nuclides such as plutonium, neptunium, etc. the proportion of fission produced cadmium and iodine increases. Thus the improved nuclear fuel element of this invention provides long term protection against failure over an extended range of exposure.

The mechanical/chemical synergism of this invention is demonstrated as follows. Iodine causes cracking in the cladding container most severely at relatively slow strain rates whereas cadmium requires a rapid strain rate to make cracks propagate through the cladding container wall. The structure and composition of this invention provides resistance to cracking at both high and low strain rate ranges.

Another aspect of the mechanical/chemical synergism is that fuel bonding to the cladding tube is minimized by the construction and the chemical composition described herein. The bonding of the ceramic fuel material to the cladding wall is both a source of mechanical stress and a conduit for the transport of oxygen and potentially harmful fission products from the fuel into the cladding.

The following examples illustrate the practice and attributes of this invention.

Interaction, if any, and the extent thereof with respect to zirconium metal and nuclear fuel consisting of conventional uranium dioxide and a modified uranium dioxide with kaolinite clay additive was evaluated as follows:

A wafer of crystal bar zirconium metal was placed between and in surface contact under pressure with two uranium dioxide fuel pellets, one consisting only of uranium dioxide and the other consisting of uranium dioxide with one percent weight of kaolinite clay additive dispersed through it. The superimposed composite of uranium dioxide/zirconium metal/uranium dioxide with additive kaolinite forming a test specimen was heated at the rate of about 3.81° C. per second up to 1400±25° C. under a contact pressure of about 175 pounds per square inch while in an atmosphere of about 99.99 percent argon gas. This composite test specimen of the three components was held at a temperature of about 1400° C. for 30.5 minutes, then cooled at a rate of about 1.3° C. per second down to a temperature of 600° C. whereupon the test specimen was allowed to cool at a natural slow rate to room temperature.

The firmly bonded together three component test specimen was cut into two sections along its longitudinal axis and thus transversely through each of the three components for examination of their two interfaces by means of optical metallography and scanning electronic microscopy.

The optical metallography and scanning electron microscopy examinations showed a significantly smaller reaction area at the interface between kaolinite modified uranium dioxide and the zirconium metal that occurred at the other interface of the specimen between the unmodified uranium dioxide and the zirconium metal. Moreover, the phases observed in kaolinite modified uranium oxide/zirconium metal interface interaction area indicate reduced diffusion of oxygen from the uranium dioxide into the zirconium metal with respect to the other specimen interface including unmodified uranium dioxide.

This comparative evaluation of the invention demonstrates the benefits of an aluminum silicate modified uranium dioxide fuel with zirconium metal in a fuel element, comprising reduced chemical interaction under severe and aggressive conditions equating accidental excessively rapid power increases. It also illustrates in an accelerated out-of-reactor test at high temperature what is believed to occur under normal operating conditions within a fuel rod at long times, that is, during long-time exposure to the reactor service conditions.

A comparative analysis of several prior art fuel element concept and that of the fuel element of this invention was carried out to evaluate their relative performance: namely the prior art designs comprising a standard fuel element consisting of unmodified uranium oxide fuel in a simple zircaloy-2 container; a fuel element of unmodified uranium oxide fuel in a zircaloy-2 container having an unalloyed zirconium liner metallurgically bonded over its inner surface; a fuel element modified with an additive of aluminum silicate in the uranium oxide fuel in a simple zircaloy-2 container; and the composite of construction and material of this invention which consists of a fuel element modified with an additive of aluminum silicate in the uranium oxide fuel in a zircaloy-2 container having an unalloyed zirconium liner metallurgically bonded over its inner surface. The amount and source of the aluminum silicate additive to the fuel and the dimensions and properties of the unalloyed zirconium barrier liner, when used, were the same in each instance, namely 0.25 percent by weight of kaolinite clay, and a zirconium metal liner of 0.003 inches thickness.

Figure 3:
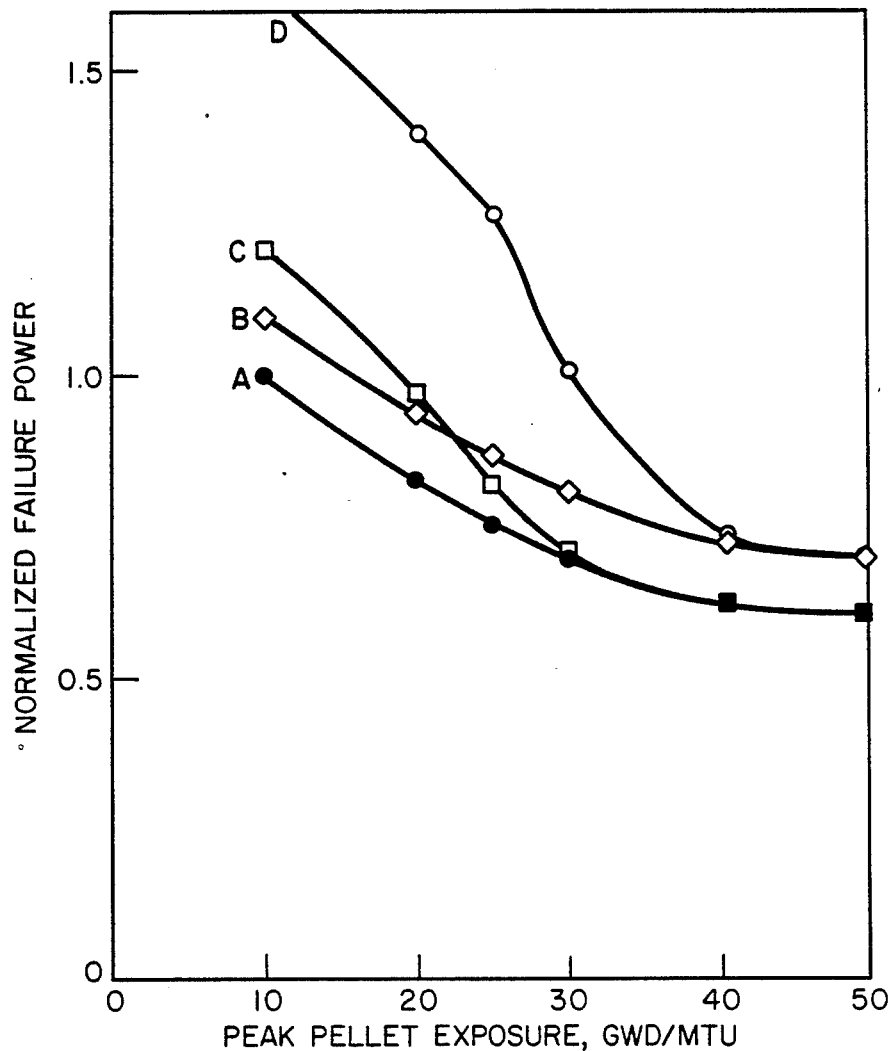
FIG. 3 is a graph illustrating the comparative results of an analysis of this invention with respect to prior art designs.

The effects of additive fuel when used in combination with barrier cladding on the reliability of a fuel rod are shown in FIG. 3. This figure represents the results of analytic and experimental investigations of the joint and separate effects of additive pellets and barrier cladding. It shows the power for the onset of PCI failure relative to observed failure power as a function of exposure. Regions below each of the four curves in FIG. 3 represent combinations of power and exposure at which a fuel rod can be operated without experiencing failure. Regions on or above the curve show conditions at which failure is expected by the stress corrosion cracking mechanism which has been herein described.

FIG. 3 was constructed from experimental data using an analytic model that computes the thermal and mechanical conditions within an operating fuel rod. Experimental data from irradiation tests were first evaluated to establish the cladding stress for the onset of failure in rods containing conventional non-additive pellets in conventional, Zircaloy-2 cladding and in the zirconium-lined (barrier) cladding. This stress level was then used with the same analytic model to determine the expected behavior of additive pellets with barrier cladding. The study used rods with design features representative of fuel in commercial, thermal-neutron-reactors. In the analysis, rods operated at relatively low power, 7 kW/ft to varying exposures and then underwent an instantaneous increase in power to a new, higher power level. Powers for failure were determined on the basis of cladding stress relative to the level associated with experimentally observed failures.

It should be noted that the results shown in FIG. 3 ignore the effects of the additive phase on damaging fission products. The chemical state and quantity of the fission products that contribute to failure were assumed to be sufficient to cause failure once the critical cladding stress was reached. This treatment does not address the ameliorating effects of the additive phase on fission products. The analyses, therefore, represent a lower estimate of the expected improvement in fuel rod reliability.

Results of this parametric investigation indicate the use of either additive pellets or barrier cladding raises the power levels at which a fuel rod can operate without failure. More importantly, the results also show the use of additive pellets in combination with barrier cladding raises the power level for reliable operation above the levels expected for either additive pellets or barrier cladding when used alone or that expected by simply adding the benefit of one to the other. The margin of improvement due to the additive-barrier combination changes with exposure. It remains significant, however, over most of the operating life of a fuel rod in a typical, thermal-spectra reactor and thereby presents the opportunity for hitherto unexpected improvements in performance and reliability.

These calculations can illustrate only the mechanical synergy, which is apparent mainly in the early stages or irradiation. The analytical model is not capable of predicting the chemical synergy which we know to exist from experimental data. Therefore the benefits at exposures beyond 35 MWd/kg U are not seen in this example, but are being verified by irradiation tests. To verify the expected benefits of this invention fuel rods with 0.25% bentonite and zirconium barrier cladding were placed into the Duane Arnold reactor for irradiation and they have been operated successfully.

What is claimed is:

1. A nuclear fuel element comprising an elongated composite cladding container of a zirconium alloy tube consisting of constituents, other than the zirconium, in amounts greater than about 5000 parts per million by weight and having a barrier lining of zirconium metal in a thickness of from about 5 percent to about 30 percent of the thickness of said alloy tube, metallurgically bonded to the inner surface of the alloy tube, a central core of nuclear fuel material disposed within and partially filling said lined tubular container so as to leave a gap between said container and fuel providing the core, said nuclear fuel material being selected from the group consisting of compounds of uranium, plutonium, thorium and mixtures thereof which contain dispersed therethrough an additive of aluminum silicate in an effective amount up to about 5 percent by weight of the fuel material.

2. The nuclear fuel element of claim 1, wherein the aluminum silicate additive is clay.

3. The nuclear fuel element of claim 1, wherein the aluminum silicate additive is dispersed through the nuclear fuel material in an amount of about 0.05 to about 1.0 percent by weight of the fuel material.

4. The nuclear fuel element of claim 1, wherein barrier lining of zirconium metal comprises sponge zirconium.

5. A nuclear fuel element comprising an elongated composite cladding container of a zirconium alloy tube consisting of constituents, other than the zirconium, in amounts greater than about 5000 parts per million by weight and having a barrier lining of sponge zirconium metal in a thickness of from about 1 percent to about 30 percent of the thickness of zirconium alloy tube, metallurgically bonded to the inner surface of the zirconium alloy tube, a central core of nuclear fuel material disposed within and partially filling said lined tubular container so as to leave a gap between said container and fuel providing the core, said nuclear fuel material comprising an oxide of uranium which contains dispersed therethrough an additive of aluminum silicate in an amount of about 0.01 percent up to about 5 percent by weight of the fuel material.

6. The nuclear fuel element of claim 5, wherein the sponge zirconium metal of the barrier lining comprises constituents, other than zirconium, in amounts ranging from about 1000 up to 5000 parts per million by weight.

7. The nuclear fuel element of claim 5, wherein the aluminum silicate additive is dispersed through the nuclear fuel material in an amount of about 0.1 percent to about 1.0 percent by weight of the fuel material.

8. The nuclear fuel element of claim 5, wherein the aluminum silicate additive is clay.

9. The nuclear fuel element of claim 5, wherein the aluminum silicate additive is kaolin.

10. A nuclear fuel element comprising an elongated composite cladding container of a zirconium alloy tube consisting of constituents, other than the zirconium, in amounts greater than about 5000 parts per million by weight and having a barrier lining of sponge zirconium comprising constituents, other than zirconium, in amounts ranging from about 1000 up to 5000 parts per million by weight, in a thickness of from about 5 percent to about 30 percent of the thickness of the zirconium alloy tube, metallurgically bonded to the inner surface of the zirconium alloy tube, a central core of nuclear fuel disposed within and partially filling said lined tubular container so as to leave a gap between said container and fuel providing the core, said nuclear fuel material comprising uranium dioxide which contains dispersed therethrough an additive of aluminum silicate in amounts of about 0.1 percent to about 1.0 percent by weight of the fuel material.

* * * * *